United States Patent
Schweid

(10) Patent No.: US 6,985,640 B2
(45) Date of Patent: Jan. 10, 2006

(54) PARALLEL NON-ITERATIVE METHOD OF DETERMINING AND CORRECTING IMAGE SKEW

(75) Inventor: Stuart A. Schweid, Pittsford, NY (US)

(73) Assignee: Xerox Corporation, Stamford, CT (US)

(*) Notice: Subject to any disclaimer, the term of this patent is extended or adjusted under 35 U.S.C. 154(b) by 735 days.

(21) Appl. No.: 10/040,810

(22) Filed: Jan. 7, 2002

(65) Prior Publication Data
US 2003/0128895 A1 Jul. 10, 2003

(51) Int. Cl.
G06K 9/32 (2006.01)
(52) U.S. Cl. .......... 382/289; 382/282; 382/284; 358/538; 358/540
(58) Field of Classification Search .......... 382/112, 382/135, 137, 289, 291, 293, 295, 296, 297, 382/282, 284; 358/452, 453, 474, 486, 488, 358/496, 538, 540
See application file for complete search history.

(56) References Cited

U.S. PATENT DOCUMENTS

| | | | |
|---|---|---|---|
| 4,723,297 A | | 2/1988 | Postl |
| 5,001,766 A | | 3/1991 | Baird |
| 5,027,227 A | * | 6/1991 | Kita .......... 358/488 |
| 5,187,753 A | | 2/1993 | Bloomberg et al. |
| 5,355,420 A | | 10/1994 | Bloomberg et al. |
| 5,359,677 A | * | 10/1994 | Katsurada et al. .......... 382/290 |
| 5,373,371 A | * | 12/1994 | Masui .......... 358/444 |
| 5,452,374 A | * | 9/1995 | Cullen et al. .......... 382/293 |
| 5,528,387 A | * | 6/1996 | Kelly et al. .......... 358/488 |
| 5,671,440 A | * | 9/1997 | Curry .......... 345/656 |
| 6,049,409 A | * | 4/2000 | Nakaie .......... 359/216 |

OTHER PUBLICATIONS

"Accurate Skew Estimation and the Top-Down Analysis of Document Images." Baird, Henry S. Dec. 12, 1986.
"Measuring Document Image Skew and Orientation." Bloomberg et al. *SPIE Symposium in Document Recognition II*, 1995.

* cited by examiner

Primary Examiner—Sanjiv Shah
Assistant Examiner—Yosef Kassa
(74) Attorney, Agent, or Firm—Fay, Sharpe, Fagan, Minnich & McKee, LLP

(57) ABSTRACT

A method of determining image skew in a scanned document includes scanning the image and determining on a pixel-by-pixel basis whether or not pixels are ON or OFF on scan lines and columns along both the fast and slow scan directions for a particular document rotation angle. Through one read of the image, image data is sampled simultaneously at a plurality of predetermined document rotation angles From the sampled data, the second order moment of the number of ON pixels is calculated as a function of document rotation angle for scan lines along both the fast and slow scan directions, yielding two independent skew angle estimates Skew angle estimates corresponding to valid second order moment data sets are compared and combined to provide a resultant skew angle estimate for the document.

21 Claims, 6 Drawing Sheets

PARALLEL NON-ITERATIVE METHOD OF DETERMINING AND CORRECTING IMAGE SKEW

BACKGROUND OF THE INVENTION

The present invention relates to the art of image processing It finds particular application in conjunction with determining and correcting image skew of a digital image, and will be described with particular reference thereto. It is to be appreciated, however, that the invention also finds application in conjunction with determining image skew in images acquired using a variety of image acquisition and output devices, such as scanners, and xerographic copiers and printers Lines of text within images of scanned documents are typically brought into nearly upright orientation within a rotation of a multiple of 90 degrees The multiple describes the orientation of the image. For example, if the required rotation orientation is 0 or 180 degrees, the image is in portrait mode, while a required rotation orientation of 90 or 270 degrees indicates that the image is in landscape mode. After such rotation, the text lines, if they exist, typically have a small amount of skew, generally less than 5 degrees with respect to the raster lines In many image processing applications, it is desirable to determine and correct skew of a document image. For example, many text recognition systems, such as optical character recognition (OCR) systems, fail if presented with text oriented with a skew of more than a few degrees, not to mention if the text is oriented sideways or upside-down. In addition, it is easier to identify text lines and text columns if the image skew is known or the image is deskewed.

A variety of methods for determining image skew have been proposed One approach involves using bounding boxes of connected components to estimate image skew. The coordinates of a token point, on the bottom center of the bounding box, are selected, and a function $S_{tokens}$ of skew angle is computed from these coordinates. Specifically, the function $S_{tokens}(\theta)$ is the sum of squares of the number of such points computed along a set of lines with the angle $\theta$ to the raster direction A vertical shear is simulated on the set of points and the sums over the points with the same y-coordinate are determined Aside from a constant (independent of $\theta$), the function $S_{tokens}$ is the variance of the number of tokens on a line, as a function of angle. This variance is a maximum in the direction where the tokens for each text line fall near the same line.

Another method for determining skew traverses straight lines of the image at a set of angles relative to the raster direction A function $S_\delta(\theta)$ is computed that has a maximum value when the scan direction $\theta$ is along the text lines. Unlike the approach described above, which computes tokens from connected components, this method uses every pixel in the image. The function $S_\delta(\theta)$ is similar to the function $S_{tokens}(\theta)$ in the sense that an angle $\theta$ is chosen and pixel sums are found along lines in the image at this angle. However, instead of squaring the sum of tokens, the second method squares the difference between sums of ON pixels on adjacent lines, and the function $S_\delta(\theta)$ is found by summing over all lines. The function $S_\delta(\theta)$ is, aside from a constant, the variance in the difference between pixel sums on adjacent lines at the angle $\theta$ The deskew methods described above, along with other deskew methods, use an iterative estimation approach based upon the method disclosed by Baird in U.S. Pat. No. 5,001,766. The Baird method requires a local copy of the image to be stored, thus obviating pipeline processing. Further, the iterative nature of Baird's method eliminates the possibility of parallel processing Therefore, the speed at which an image may be deskewed is necessarily limited Also, such iterative approaches may lead to local maximums instead of the correct global maximum and, therefore, report false angles in complex documents.

The present invention contemplates a new and improved method and apparatus for determining and correcting image skew, which overcomes the above-referenced problems and others.

SUMMARY OF THE INVENTION

In accordance with one aspect of the present invention, a method of determining skew of an image in an optical scanning device includes optically scanning a document to produce scanned image data, which includes a plurality of scan lines having ON and OFF pixels. The image data is sampled on at least one scan line along a fast scan direction and a slow scan direction for one document rotation angle in order to determine a number of ON pixels on each scan line A fast scan second order moment data set is calculated based on the number of ON pixels on the at least one scan line along the fast scan direction for a plurality of document rotation angles. A slow scan second order moment data set is calculated based on the number of ON pixels on the at least one scan line along the slow scan direction for a plurality of document rotation angles. A first skew angle estimate is calculated from the fast scan second order moment data set and a second skew angle estimate is calculated from the slow scan second order moment data set. The validity of the fast scan and slow scan second order moment data sets is determined and the calculated skew angle estimates corresponding to valid second order moment data sets are combined to yield a resultant skew angle.

In accordance with a more limited aspect of the present invention, the method includes reading a pixel at a first document rotation angle where the pixel is located on a first scan line Without rotating the document, the pixel is projected onto other scan lines, which correspond to a plurality of predetermined document rotation angles. If the pixel is an ON pixel, a plurality of counters are simultaneously updated where each counter corresponds to one of the plurality of predetermined document rotation angles.

In accordance with a more limited aspect of the present invention, the fast scan second order moment data set is calculated by an equation of the form $$\sum_{i=1}^{N} (n_i)^2$$

where N is the number of scan lines along the fast scan direction, n is the number of ON pixels in a scan line, and i is a counter for the scan lines along the fast scan direction.

In accordance with a more limited aspect of the present invention, the slow scan second order moment data set is calculated by an equation of the form $$\sum_{j=1}^{M} (m_j)^2$$

where M is the number of scan columns along the slow scan direction, m is the number of ON pixels in a scan column, and j is a counter for the scan columns along the slow scan direction.

In accordance with a more limited aspect of the present invention, the fast scan and slow scan second order moment data sets are locally fit near a measured maximum with an equation of the form $$S_\alpha = S_{\alpha max} - k|\alpha - \alpha_{max}|$$

where $S_{\alpha max}$ is a maximum second order moment, and $\alpha_{max}$ is the document rotation angle at which $S_{\alpha max}$ occurs.

In accordance with a more limited aspect of the present invention, second order moment data sets which do not have a single dominant peak are invalidated In addition, second order moment data sets not having a dominant peak which corresponds to a strictly decreasing function are invalidated In accordance with a more limited aspect of the present invention, a first quality factor related to the strength of a single dominant peak is calculated The first quality factor is compared to a first predetermined threshold. A second quality factor related to the slope of the single dominant peak is calculated and compared to a second predetermined threshold.

In accordance with a more limited aspect of the present invention, the step of combining skew angle estimates corresponding to valid data sets includes determining how many second order moment data sets are valid If no valid second order moment data set exists, failure is declared and no resultant skew angle is reported. If one valid second order moment data set exists, the skew angle estimate corresponding to the valid second order moment data set is reported If both the fast scan and slow scan second order moment data sets are valid, a difference between the first quality factors for the fast scan and slow scan second order moments are calculated The quality factor difference is compared to a difference threshold If the quality factor difference is greater than the difference threshold, the skew angle estimate corresponding to the second order moment data set having a larger first quality factor is reported. If the quality factor difference is less than the difference threshold, a skew angle difference between the first and second skew angle estimates is calculated The skew angle difference is compared to a third predetermined threshold If the skew angle difference is greater than the third predetermined threshold, the smaller skew angle estimate is reported If the skew angle difference is less than the third predetermined threshold, the first and second skew angle estimates are averaged to yield a resultant skew angle.

In accordance with another aspect of the present invention, a method of determining a document skew angle includes scanning a document to produce image data made up of scan lines having ON and OFF pixels A first independent skew angle estimate is determined based on a number of ON pixels on a plurality of scan lines along a fast scan direction A second independent skew angle estimate is determined based on a number of ON pixels on a plurality of scanned columns along a slow scan direction. The first and second independent skew angle estimates are merged to yield the document skew angle.

In accordance with a more limited aspect of the present invention, the determining steps include, without rotating the document, simultaneously calculating a second order moment of ON pixels on the scan lines along the fast scan direction at a plurality of document rotation angles Further, without rotating the document, a second order moment of ON pixels on the scan columns along the slow scan direction is simultaneously calculated at a plurality of document rotation angles.

In accordance with another aspect of the present invention, a xerographic apparatus programmed to determine image skew of a scanned document includes an imaging platen and means for scanning successive scan lines of the document, where the scan lines have ON pixels and OFF pixels A memory stores scanned image data representing a skewed image Reading means are employed for reading a pixel at a first document rotation angle, where the pixel is located on a first scan line. Projection means project the pixel onto other scan lines corresponding to a plurality of predetermined document rotation angles. A plurality of pixel counters simultaneously count a number of ON pixels along a plurality of scan lines and columns A skew angle processor computes first and second independent skew angle estimates based on the number of ON pixels along the plurality of scan lines and columns The skew angle processor merges the first and second skew angle estimates to yield a resultant skew angle. An image processor corrects the skewed image in accordance with the resultant skew angle. Transferring means transfer an image charge pattern onto a photoreceptor. At least one developing station develops the charge pattern and at least one fuser fixes a developed image onto a physical media One advantage of the present invention resides in efficient skew angle determination employing parallel processing Another advantage of the present invention resides in the use of two independent skew angle estimations.

Another advantage of the present invention is resides in determining skew angle without storing a local copy of the image Yet another advantage of the present invention resides in simultaneous calculation of a second order moment at multiple sampling angles through one read of the image data.

Still other benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps The drawings are only for purposes of illustrating preferred embodiments and are not to be construed as limiting the invention.

DETAILED DESCRIPTION OF THE PREFERRED EMBODIMENTS

Figure 1:
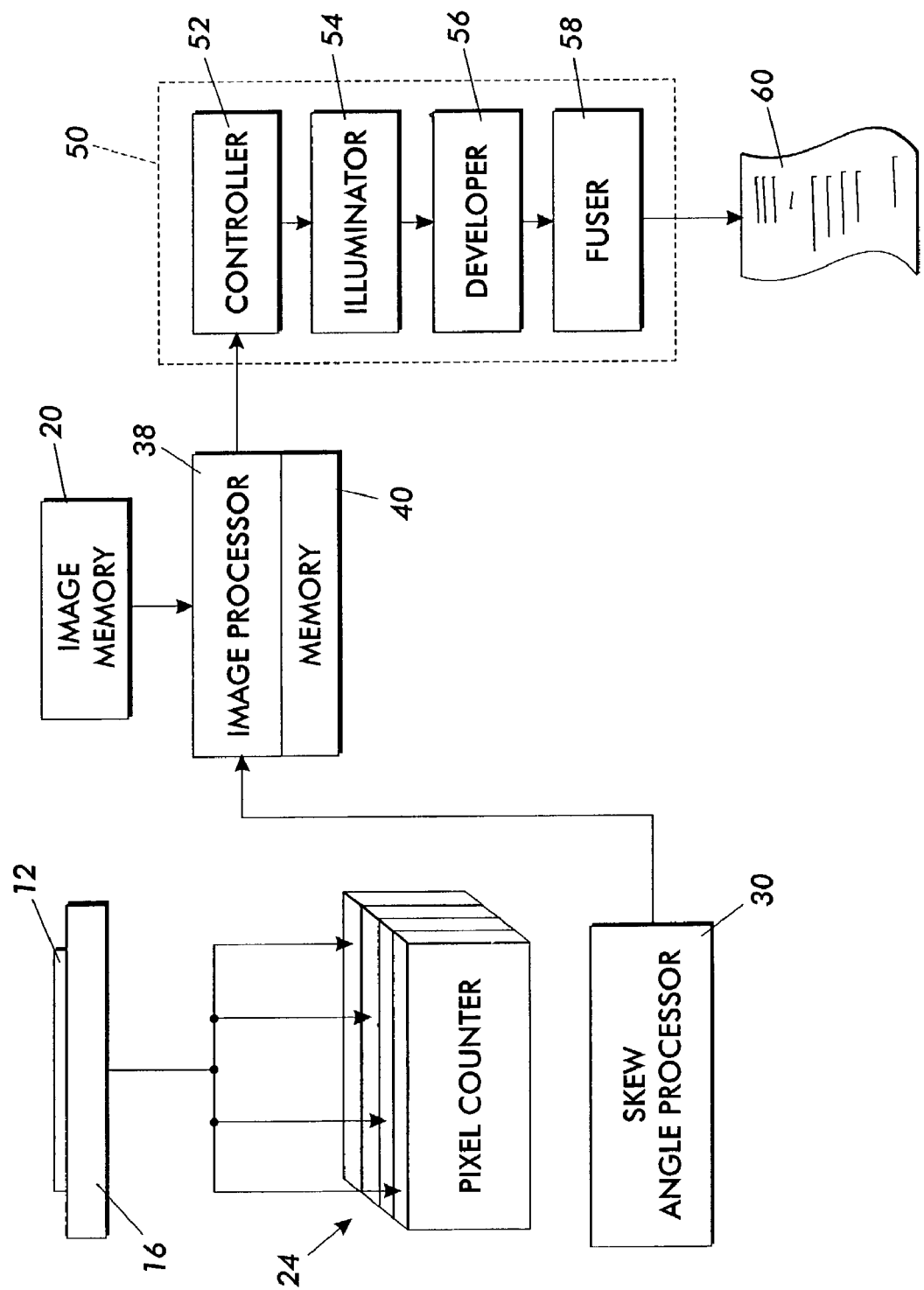
FIG. 1 is a functional block diagram of an imaging apparatus suitable to practice an embodiment of the present invention.

With reference to FIG. 1, an imaging apparatus is illustrated which determines and corrects image skew in a scanned document 12 Image skew refers to rotational error between the dominant orientation of lines of printed objects, such as characters, within a document and a reference line observed by a reader or scanner as being zero rotational error A scanner 16 scans the document 12 in a conventional manner, producing electrical scanned image data, a copy of which is stored in an image data memory 20. The scanned image data is represented as a two-dimensional data set of pixel information. The data set consists of line data in one dimension and column data in the other dimension. Due to the rastering motion of the particular input device in the scanner, a line of data is acquired relatively quickly In contrast, each column of data, which is perpendicular to the line of data, is acquired relatively slowly. Accordingly, the axis of the image or acquired data set that is parallel to each line of data is referred to as the fast scan direction. Analogously, the axis of the image or acquired data set that is parallel to each column of data is referred to as the slow scan direction.

The digitized scan lines and columns of data are comprised of individual pixels considered to be an ON pixel or an OFF pixel. Pixels are defined to be ON if they are black and OFF if they are white It is to be appreciated that the designation of black as ON and white as OFF reflects the fact that most documents of interest have a black foreground and a white background However, it is to be appreciated that the present invention is equally applicable to negative images as well As is explained more fully below, through one "read" of the image, the image data is sampled at a plurality of predetermined document rotation angles to determine the number of ON pixels per sampled scan line More particularly, the second order moment of the number of ON pixels is calculated for various document rotation angles. The second order moment, which is sometimes referred to as the variance, is the mean value of the sum of the square of the number of ON pixels on each scan line for a given document rotation angle. The second order moment is calculated as a function of document rotation angle for scan lines and columns along both the fast scan and slow scan directions, yielding fast scan and slow scan second order moment data sets From the fast scan and slow scan second order moment data sets, first and second skew angle estimates are calculated, compared, and combined to yield a resultant skew angle.

Rather than computing the second order moment for a given document rotation angle, rotating the image, and repeating the process, the second order moments for several document rotation angles are simultaneously calculated and updated on a pixel-by-pixel basis. For a given document rotation angle, as each pixel is read, i.e., determined to be ON or OFF, that pixel's location is calculated for all predetermined document rotation angles simultaneously by a plurality of pixel counters 24 and the corresponding row and column sums of ON pixels are updated In other words, rather than rotating the image, counting the ON pixels, and calculating the complete second order moment at that particular document rotation angle, as each pixel is read, its location is calculated simultaneously for each document rotation angle to be sampled as if it were rotated and added in at that time Therefore, through one read of the image, the row and column pixel sums at each of the predetermined document rotation angles are calculated simultaneously The plurality of pixel counters 24, which facilitate parallel processing, transfer second order moment data sets for both the fast scan and slow scan directions to a skew angle processor 30, which processes the second order moment data sets to yield a resultant image skew angle.

An image processor 38, containing a memory 40, receives the calculated skew angle estimate and applies it to the scanned image data received from the image data memory 20. The image processor 38 corrects the skew error present in the image in accordance with the resultant skew angle estimate received from the skew angle processor 30. Skew correction involves rotating the original image stored in the image data memory 20 by the negative of the skew angle determined by the skew angle processor so as to deskew the image. Such means for rotating the image are well known, and include, for small angles of rotation (less than 5 degrees), applying two orthogonal shears For larger skew angles, rotation can be approximated by three shears, with the first and third shear of equal magnitude in the horizontal direction and the second larger shear in the vertical direction The deskewed digital image representation is output to one of a plurality of image output devices, such as a xerographic printer 50 In this embodiment, the digital image representation is transferred to an image processing controller 52 The controller communicates the image data to the remainder of the printing machine, including an illuminator 54, which transfers a physical image onto a photosensitive surface, at least one developer station 56, and a fuser station 58, which produces a hard copy 60 of the scanned image. Alternatively, the digital image representation is output to a computer or network More particularly, in the practice of conventional xerography, an electrostatic latent image is formed on a xerographic surface by first uniformly charging a charge retentive surface, such as a photoreceptor The charged area is selectively dissipated in accordance with a pattern of activating radiation corresponding to original images The selective dissipation of the charge leaves a latent charge pattern on the imaging surface corresponding to areas not exposed to radiation.

The charge pattern is made visible by developing it with toner by passing the photoreceptor past at least one developer station 56. The toner is generally a black or colored powder, which adheres to the charge pattern by electrostatic attraction. The developed image is then fixed to the imaging surface or is transferred to a receiving substrate, such as plain paper or other physical media, to which it is fixed by suitable fusing techniques.

Figure 2:
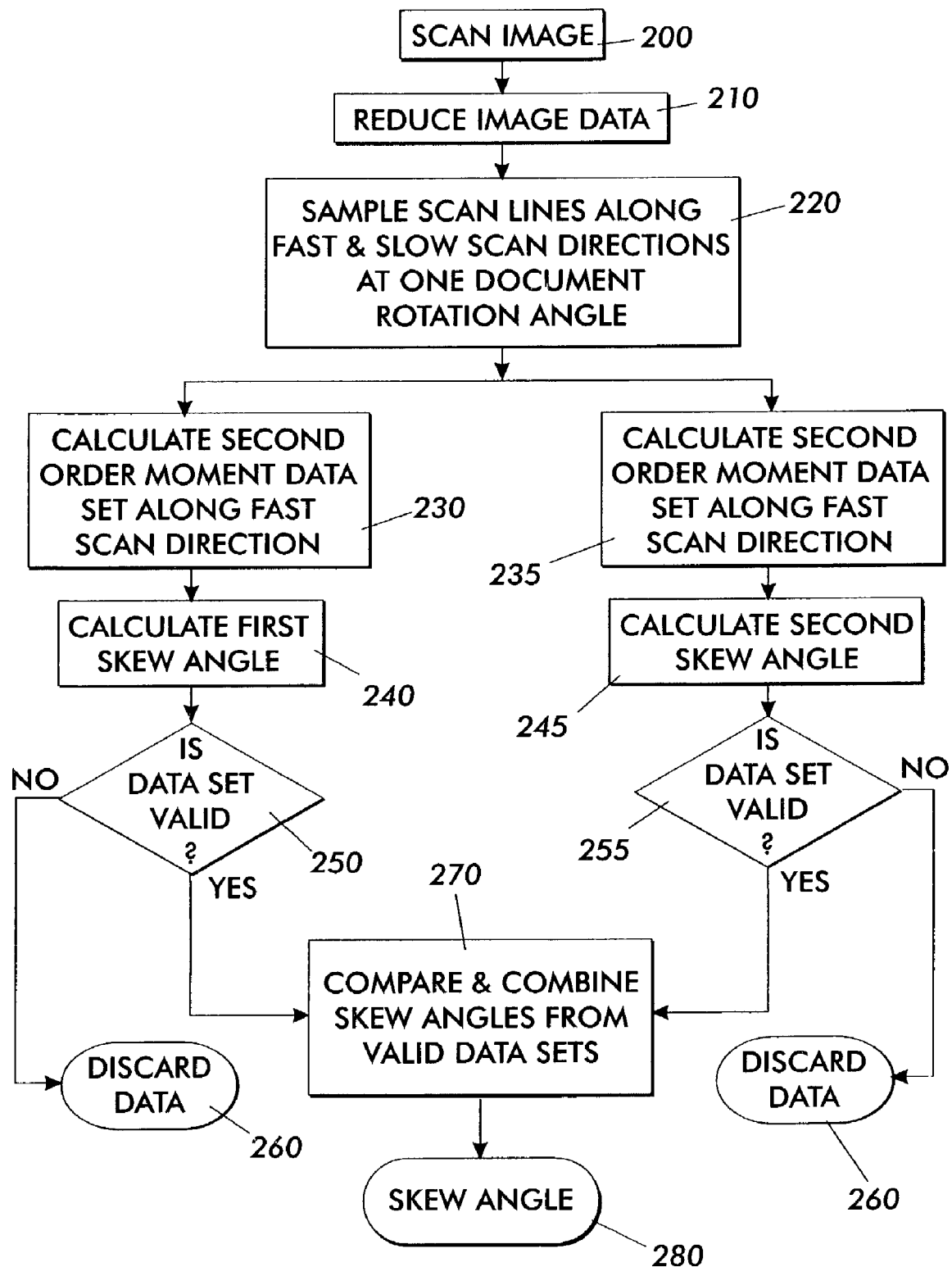
FIG. 2 is a flow chart illustrating a method of determining image skew in accordance with the present invention.

With reference to FIG. 2 and continuing reference to FIG. 1, a method of determining image skew of a scanned document is illustrated A document is scanned 200 in a conventional manner, producing scanned image data Optionally, the image data is reduced 210 so as to accelerate the process Reduction is a scale operation characterized by a scale factor A and a threshold level B. Reduction with scale=A entails dividing the source image into A×A squares of pixels, mapping each such square in the source image to a single pixel on the destination image The value for the destination image pixel is determined by the threshold level B, which is a number between 1 and $A^2$. If the number of ON pixels in the pixel square is greater than or equal to B, the destination pixel is considered to be ON, otherwise it is considered to be OFF The advantage of performing the operation at a reduced scale is that the time to perform each operation, such as counting, varies with the square of the reduction factor. For example, a reduction by a factor of 4 reduces the computation time by a factor of 16.

It is to be appreciated that while a conventional reduction step is discussed above, other forms of reduction may be employed, such as sub-sampling Sub-sampling is an operation wherein the source image is subdivided into smaller, typically square elements. Each element in the source image is mapped to a smaller element in the destination image. The pixel values for each destination image element are defined by a selected subset of the pixels in the source image element Typically, sub-sampling entails mapping to single pixels, with the destination pixel value being the same as a selected pixel from the source image element.

Figure 3:
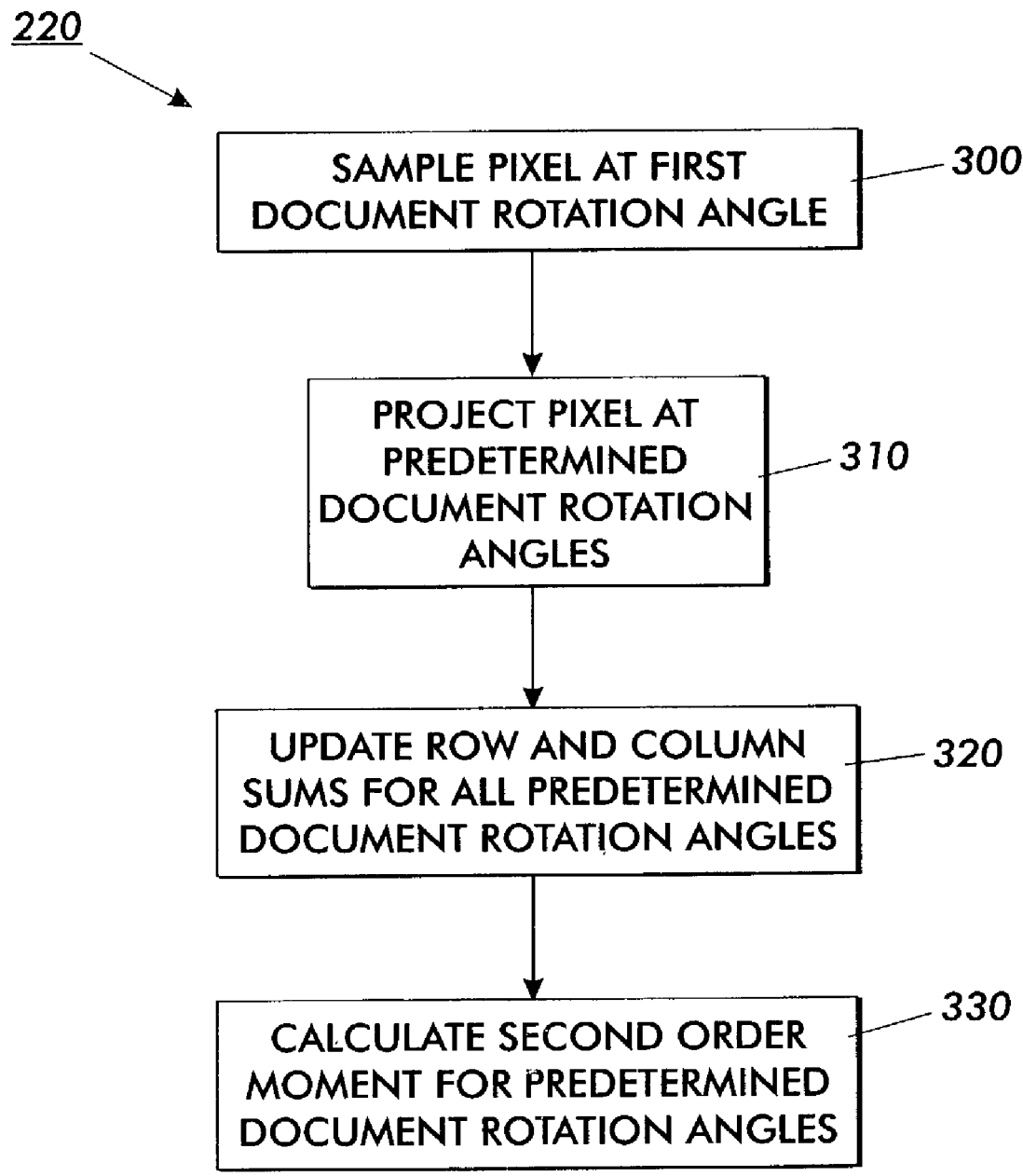
FIG. 3 is a flow chart illustrating a method of simultaneously sampling pixel data at a plurality of document rotation angles in accordance with the present invention.
Figure 4:
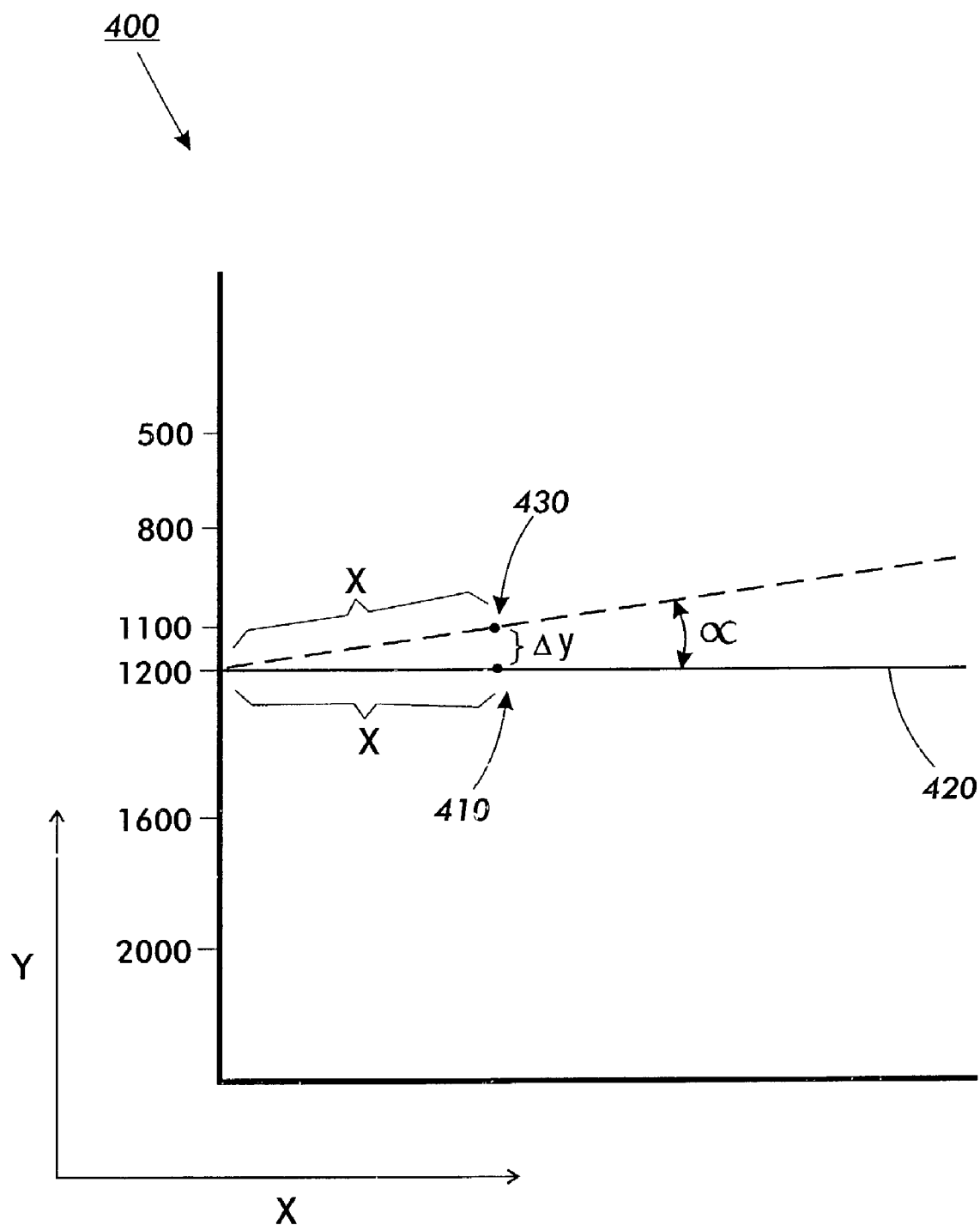
FIG. 4 is a diagrammatic illustration of the method provided in FIG. 3.

Scan lines and columns of image data are sampled 220 along two directions, i e, the fast scan and slow scan directions, at a first predetermined document rotation angle in order to determined the number of ON pixels per sampled scan line or column. More particularly, through one read of the image, the image data is sampled simultaneously at a plurality of predetermined document rotation angles to determine the number of ON pixels per sampled scan line or column. With reference to FIG. 3 and continuing reference to FIG. 2, for a given document rotation angle, a pixel is sampled or read 300, that is, determined to be either ON or OFF Rather than sum the number of ON pixels at a particular document rotation angle, calculate the second order moment at that particular document rotation angle, and rotate the image to the next predetermined document rotation angle, the location of the pixel being sampled is projected for a plurality of predetermined document rotation angles. In other words, for a sampling scheme in which pixels are sampled along scan lines and columns at D predetermined document rotation angles, the modified location of the particular pixel at the D document rotation angles is calculated in parallel by the plurality of pixel counters or processors For example, with reference to FIG. 4 and continuing reference to FIGS. 2 and 3, a document 400 having a plurality of scan lines is illustrated For example, at a given document rotation angle of zero miliradians, a particular pixel 410, which is determined to be ON, is located at a certain x value on scan line 1200 420. Pixel 410 is counted and added up along scan line 1200 420 However, for a different document rotation angle, e.g., α=1 miliradian, the pixel at position 410 would move to position 430 on scan line 1100. It is to be appreciated that projected pixel position 430 is calculated to fall on scan line 1100 by the formula Δy=xα. Artisans will appreciate that this relationship holds true because tan α≈α for small alphas. Therefore, as each pixel is read for an initial document rotation angle, the scan line onto which it would project is calculated and the subsequent pixel count is updated for 20 or 30 predetermined document rotation angles to be sampled as the pixel is read. In other words, through one read of the image, the pixel sums are calculated simultaneously for all predetermined document rotation angles Referring back to FIG. 3, based on the projected pixel locations for each document rotation angle, the corresponding row and column sums are updated 320 simultaneously. As is explained more fully below, the second order moments of the ON pixels are calculated for each predetermined document rotation angle based on the updated row and column sums.

Referring back to FIG. 2, a second order moment data set is calculated 230 for scan lines along the fast scan direction In other words, the second order moment data set includes calculated second order moments as a function of document rotation angle. The second order moment is the mean value of the sum of the square of the number of ON pixels on each scan line for a given document rotation angle More particularly, the second order moment is calculated by an equation of the form $$\sum_{i=1}^{V} (n_i)^2 \tag{1}$$

where N is the number of scan lines along the fast scan direction, n is the number of ON pixels in a scan line; and i is a counter for the scan lines along the fast scan direction. Stated differently, for a given document rotation angle, the second order moment is calculated by summing the number of ON pixels across each scan line or row, squaring that sum, and summing over all of the scan lines While the second order moment is the preferred metric for determining skew angle, it is to be appreciated that other metrics may be employed, such as the square of the difference between sums of ON pixels on adjacent scan lines or the variance The same process is employed to calculate a second order moment data set along the slow scan direction 235 by performing the above-described operation, only summing along columns rather than rows. In other words, in order to calculate the second order moment data set along the slow scan direction, the number of ON pixels along scan columns are calculated by an equation of the form $$\sum_{j=1}^{M} (m_j)^2 \tag{2}$$

where M is the number of scan columns along the slow scan direction, m is the number of ON pixels in a scan column, and j is a counter for the scan columns along the slow scan direction From the fast scan and slow scan second order moment data sets, first and second skew angles are calculated 240, 245 The present invention provides two independent skew angle estimates, which are compared and combined 270 in a manner described more fully below. Each skew angle estimate 240, 245 is passed through a validation process 250, 255, where invalid data sets are discarded 260 and valid data sets are passed on to the compare and combine step 270, which ultimately yields a resultant skew angle estimate 280

Figure 5:
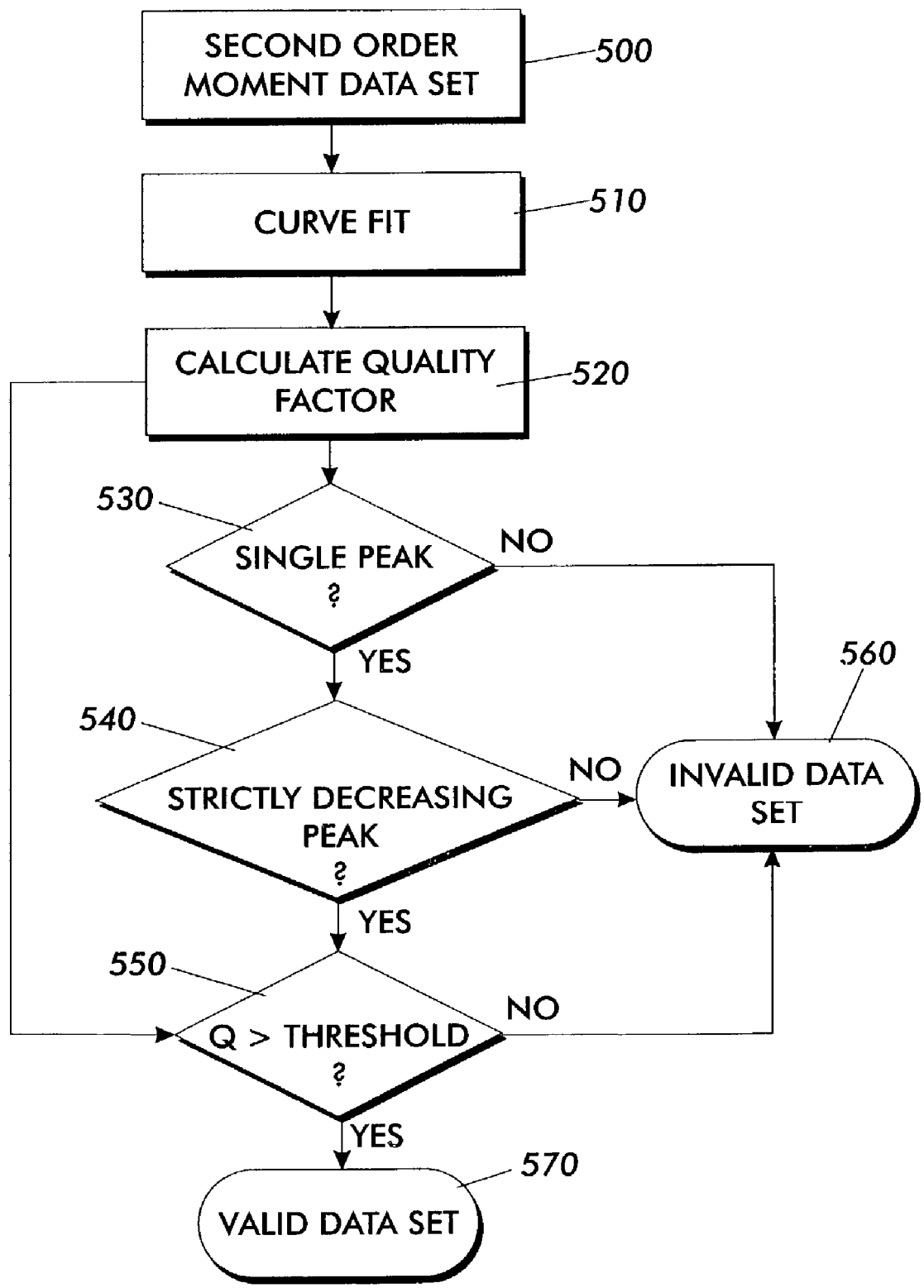
FIG. 5 is a flow chart illustrating a method of validating a second order moment data set in accordance with the present invention.

More particularly, with reference to FIG. 5 and continuing reference to FIG. 2, each second order moment data set 500 is subject to a curve fit analysis 510 in order to calculate the corresponding skew angle. More particularly, each second order moment data set is fit with an equation of the form $$S_\alpha = S_{\alpha max} - k|\alpha - \alpha_{max}| \tag{3}$$

where $S_{\alpha max}$ is the maximum second order moment value, and $\alpha_{max}$ is the document rotation angle at which $S_{\alpha max}$ occurs. From this fit, the document rotation angle at which the second order moment is substantially a maximum is computed for both the fast scan and slow scan second order moment data sets. In other words, the document rotation angle at which the maximum second order moment occurs is the skew angle estimate.

In order to determine whether the particular second order moment data set is valid, at least one quality factor or q-factor is calculated 520 More particularly, from equation (3), a local quality factor, $Q_{loc}$, is calculated according to the following equation:

$$Q_{loc} = k = \frac{S_\alpha - S_{\alpha\max}}{|\alpha - \alpha_{\max}|} \quad (4)$$

$Q_{loc}$ is equivalent to the slope of the equation fit to the particular second order moment data set at the local maximum. In addition, a global quality factor, $Q_{Global}$, is calculated according to the following equation:

$$Q_{Global} = \frac{(S_{\alpha\max} - S_{\alpha\min})}{S_{\alpha\max}} \quad (5)$$

where $S_{\alpha\min}$ is the minimum second order moment value, and $\alpha_{min}$ is the document rotation angle at which $S_{\alpha\min}$ occurs It is to be appreciated that $Q_{loc}$ and $Q_{Global}$ are indicators of the strength and integrity of both the fast scan and slow scan second order moment data sets.

The calculated quality factors are used in a number of validation or verification steps described below. The first validation step includes verifying whether each second order moment data set includes a single dominant peak or multiple peaks 530 In one embodiment, a predetermined peak-to-valley threshold is employed to determine the number of dominant peaks present in the second order moment data set However, it is to be appreciated that other conventional methods are contemplated. If multiple peaks are present, the data set is determined to be invalid 560. Assuming a single dominant peak, a peak purity test is performed in which it is determined whether the function is strictly decreasing near the dominant peak 540 If a strictly decreasing peak is not present, such as where a side node exists adjacent the dominant peak, the data set is declared to be invalid 560. Conversely, if the single peak is considered to be strictly decreasing, the q-factor or quality factor associated with the peak is compared 550 to a predetermined threshold value If the q-factor does not meet the predetermined threshold, the data set is considered to be invalid and the corresponding skew angle estimate is not used in further processing However, if the q-factor is determined to be greater than the threshold, the data set is considered to be valid 570 and the corresponding skew angle estimate is passed on to the compare and combine step 270

Figure 6:
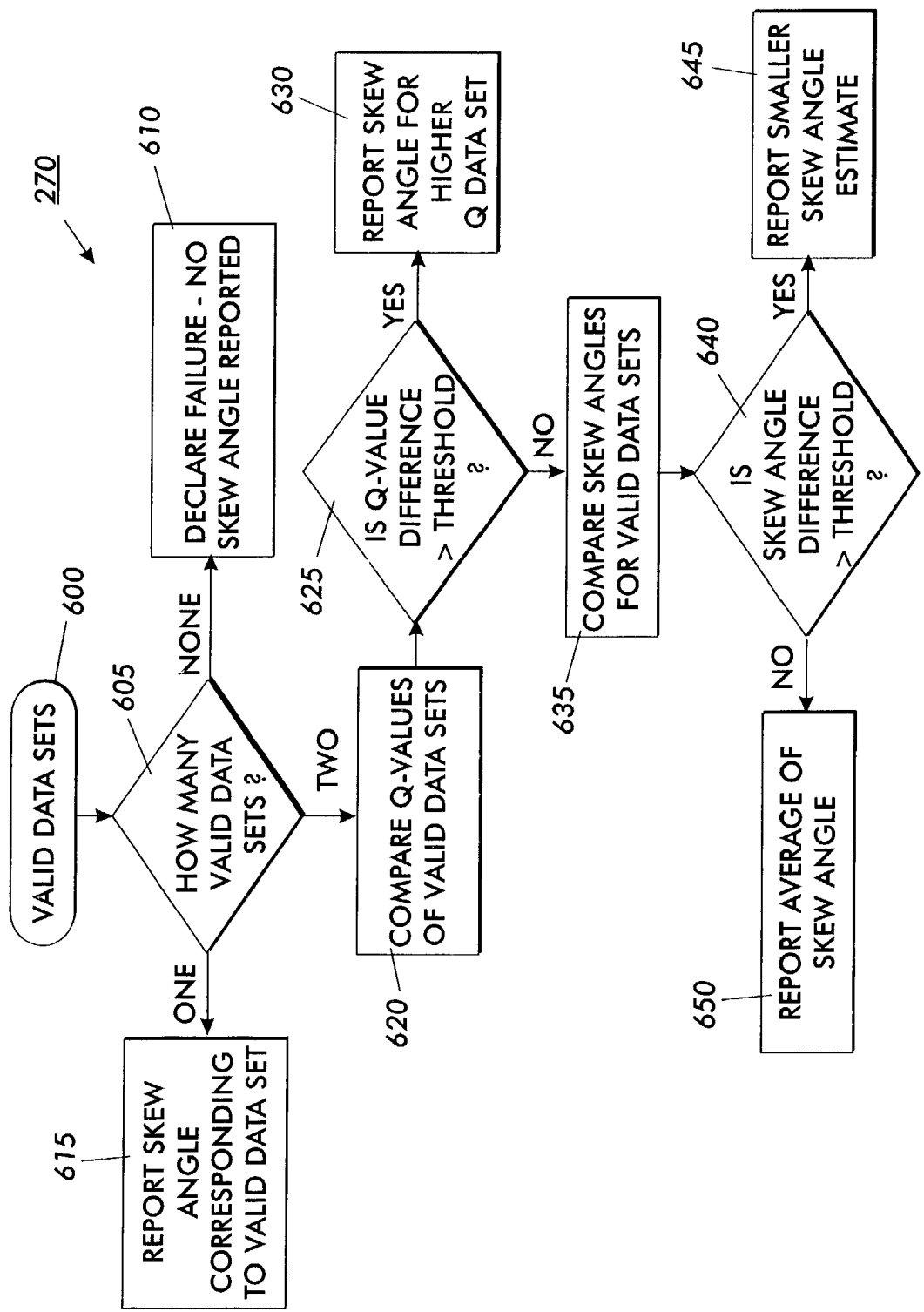
FIG. 6 is a flow chart illustrating a method of combining skew angle estimates from valid data sets in accordance with the present invention

With reference to FIG. 6 and continuing reference to FIG. 2, a method of comparing and combining 270 skew angles from valid data sets 600 is illustrated. First, the number of valid data sets is determined 605. If no valid data sets exist, failure is declared 610 and no skew angle is reported. It is to be appreciated that this condition may be present in document images containing extraordinarily large quantities of text and/or numerous varied dominant orientations of text If one valid data set is present, the skew angle corresponding to the valid data set is reported 615 as the resultant skew angle for the particular image.

In the case of two valid data sets, the corresponding q-factors, $Q_{Global}$ and/or $Q_{loc}$, for each valid data set are compared 620 to one another It is determined whether or not the difference between the q-factors of the two data sets is greater than a predetermined threshold 625. It is to be appreciated that both local and global q-factors may be considered in this determination If the q-factor differences are greater than the predetermined thresholds, the skew angle corresponding to the data set having a higher q-factor is reported 630 as the skew angle for the image This state is characterized as a single dominant data set, that is, a state where one data set has a significantly higher q-factor than the other. If the difference between the respective q-factors is less than the predetermined threshold, the skew angles for both data sets are compared 630. Namely, it is determined whether the difference in skew angles is greater than a predetermined threshold 640 If the skew angle difference is less than the predetermined threshold, the average of the two skew angles is reported 650 as the resultant skew angle for the image. In this case, it is to be appreciated that shear may be reported as well, where the shear is equivalent to the angle difference between the two skew angle estimates. However, if the difference between the first and second skew angles is greater than the predetermined threshold, the smaller skew angle estimate is reported 645 It is to be appreciated that reporting the smaller skew angle estimate provides an additional safeguard in an effort to avoid over-correction or over-manipulation of the document image The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiment, the invention is now claimed to be:

1. A method of determining skew of an image in an optical scanning device, said method comprising:
    (a) optically scanning a document to produce scanned image data including a plurality of scan lines having ON and OFF pixels;
    (b) sampling image data on at least one scan line along (i) a fast scan direction and (ii) a slow scan direction for one document rotation angle to determine a number of ON pixels on each scan line;
    (c) from the sampled image data, calculating:
        (i) a second order moment of ON pixels on the at least one scan line along the fast scan direction for a plurality of document rotation angles, said calculation yielding a fast scan second order moment data set; and
        (ii) a second order moment of ON pixels on the at least one scan line along the slow scan direction for a plurality of document rotation angles, said calculation yielding a slow scan second order moment data set;
    (d) calculating a first skew angle estimate from the fast scan second order moment data set;
    (e) calculating a second skew angle estimate from the slow scan second order moment data set;
    (f) determining whether the fast scan second order moment data set and the slow scan second order moment data set are valid; and
    (g) combining calculated skew angle estimates corresponding to valid second order moment data sets to yield a resultant skew angle.

2. The method as set forth in claim 1, wherein steps (b) and (c) include:
    reading a pixel at a first document rotation angle, said pixel being located on a first scan line;
    without rotating the document, projecting the pixel onto other scan lines corresponding to a plurality of predetermined document rotation angles; and, if the pixel is an ON pixel, simultaneously updating a plurality of counters where each counter corresponds to one of the plurality of predetermined document rotation angles.

3. The method as set forth in claim 1, wherein step (c) includes:
calculating the second order moment of a number of ON pixels in a number of scan lines along the fast scan direction by an equation of the form:

$$\sum_{i=1}^{N} (n_i)^2$$

where:
N is the number of scan lines along the fast scan direction;
n is the number of ON pixels in a scan line; and
i is a counter for the scan lines along the fast scan direction; and calculating the second order moment of a number of ON pixels in a number of scan lines along the slow scan direction by an equation of the form:

$$\sum_{j=1}^{M} (m_j)^2$$

where:
M is the number of scan columns along the slow scan direction;
m is the number of ON pixels in a scan column; and
j is a counter for the scan columns along the slow scan direction.

4. The method as set forth in claim 3, wherein calculating steps (d) and (e) include:
locally fitting the fast scan and slow scan second order moment data sets near $S_{\alpha max}$ with an equation of the form:

$$S_\alpha = S_{\alpha max} - k|\alpha - \alpha_{max}|$$

where:
$S_{\alpha max}$ is a maximum second order moment; and
$\alpha_{max}$ is the document rotation angle at which $S_{\alpha max}$ occurs;

calculating a first document rotation angle at which the second order moment is substantially a maximum for the fast scan second order moment data set; and
calculating a second document rotation angle at which the second order moment is substantially a maximum for the slow scan second order moment data set.

5. The method as set forth in claim 4, wherein step (f) further includes:
determining whether the fast scan second order moment data set includes a single dominant peak;
determining whether the slow scan second order moment data set includes a single dominant peak; and
invalidating second order moment data sets not having a single, dominant peak.

6. The method as set forth in claim 5, wherein step (f) further includes:
for second order moment data sets having a single dominant peak, determining whether the dominant peak corresponds to a strictly decreasing function; and
invalidating second order moment data sets not having a dominant peak corresponding to a strictly decreasing function.

7. The method as set forth in claim 6, wherein step (f) further includes:
for second order moment data sets having a single dominant peak calculating a first quality factor related to strength of the single dominant peak; and,
comparing the first quality factor to a first predetermined threshold.

8. The method as set forth in claim 7, wherein the first quality factor is calculated by an equation of the form:

$$Q_{Global} = \frac{(S_{\alpha max} - S_{\alpha min})}{S_{\alpha max}}$$

where:
$S_{\alpha max}$ is a maximum second order moment; and
$S_{\alpha min}$ is a minimum second order moment.

9. The method as set forth in claim 8, wherein step (f) further includes:
calculating a second quality factor related to slope of the single dominant peak; and,
comparing the second quality factor to a second predetermined threshold.

10. The method as set forth in claim 9, wherein the second quality factor is calculated by an equation of the form:

$$Q_{loc} = k = \frac{S_\alpha - S_{\alpha max}}{|\alpha - \alpha_{max}|}$$

where:
$S_{\alpha max}$ is a maximum-second order moment; and
$\alpha_{max}$ is the document rotation angle at which $S_{\alpha max}$ occurs.

11. The method as set forth in claim 8, wherein step (g) includes:
determining how many second order moment data sets are valid;
if neither second order moment data set is valid, (i) declaring failure and (ii) not reporting a resultant skew angle; and,
if one second order moment data set is valid, reporting the skew angle estimate corresponding to the valid second order moment data set.

12. The method as set forth in claim 11, wherein step (g) further includes:
if the fast scan and slow scan second order moment data sets are valid, calculating a difference between the first quality factors for the fast scan and slow scan second order moment data sets;
comparing the quality factor difference to a difference threshold; and
if the quality factor difference is greater than the difference threshold, reporting the skew angle estimate corresponding the second order moment data set having a larger first quality factor.

13. The method as set forth in claim 12, wherein step (g) further includes:
if the quality factor difference is less than the difference threshold, calculating a skew angle difference between the first and second skew angle estimates;
comparing the skew angle difference to a third predetermined threshold;

if the skew angle difference is greater than the third predetermined threshold, reporting the smaller skew angle estimate; and if the skew angle difference is less than the third predetermined threshold, averaging the first and second skew angle estimates to yield the resultant skew angle.

14. A method of determining a document skew angle comprising:
(a) scanning a document to produce image data made up of scan lines having ON and OFF pixels;
(b) determining a first independent skew angle, estimate based on a number of ON pixels on a plurality of scan lines along a fast scan direction;
(c) determining a second independent skew angle estimate based on a number of ON pixels on a plurality of scan columns along a slow scan direction; and
(d) merging the first and second independent skew angle estimates to yield the document skew angle.

15. The method as set forth in claim 14, wherein steps (b) and (c) include:
without rotating the document, simultaneously calculating a second order moment of ON pixels on the scan lines along the fast scan direction at a plurality of document rotation angles, yielding a fast scan order moment data set; and
without rotating the document, simultaneously calculating a second order moment of ON pixels on the scan columns along the slow scan direction at a plurality of document rotation angles, yielding a slow scan second order moment data set.

16. The method as set forth in claim 15, wherein steps (b) and (c) further include:
determining the document rotation angle at which the fast scan second order moment data set is substantially a maximum; and
determining the document rotation angle at which the slow scan second order moment data set is substantially a maximum.

17. The method as set forth in claim 14, wherein step (d) includes:
validity testing the fast scan and slow scan second order moment data sets; and
combining independent skew angle estimates corresponding to valid second order moment data sets.

18. The method as set forth in claim 17, wherein the validity testing step includes:
calculating at least one quality factor for each second order moment data set relating to at least one of (i) peak amplitude and (ii) peak slope; and
invalidating second order moment data sets having one of (i) multiple peaks, (ii) impure peaks, and (iii). a quality factor less than a predetermined threshold.

19. The method as set forth in claim 18, wherein the combining step includes:
determining how many second order moment data sets are valid;
if neither second order moment data set is valid, (i) declaring failure and (ii) not reporting a resultant skew angle; and,
if one second order moment data set is valid, reporting the skew angle estimate corresponding to the valid second order moment data set.

20. The method as set forth in claim 19, wherein the combining step further includes:
if both second order moment data sets are valid, comparing at least one of (i) the quality factors, and (ii) the corresponding skew angle estimates of the two valid second order moment data sets; and
in response to the comparing step, reporting one of (i) the first skew angle estimate, (ii) the second skew angle estimate, and (iii) an average of the first and second skew angle estimates.

21. A xerographic apparatus programmed to determine image skew of scanned document, said xerographic apparatus comprising:
an imaging platen;
means for scanning successive scan lines of the document, said scan lines having ON pixels and OFF pixels;
a memory for storing scanned image data representing a skewed image;
means for reading a pixel at a first document rotation angle, said pixel being located on a first scan line;
means for projecting the pixel onto other scan lines corresponding to a plurality of predetermined document rotation angles;
a plurality of pixel counters for simultaneously counting a number of ON pixels along a plurality of scan lines and columns;
a skew angle processor which (i) computes first and second independent skew angle estimates based on the number of ON pixels along the plurality of scan lines and columns, and (ii) merges the first and second independent skew angle estimates to yield a resultant skew angle;
an image processor for correcting the skewed image in accordance with the resultant skew angle;
means for transferring an image charge pattern onto a photoreceptor;
at least one developing station for developing the charge pattern; and
at least one fuser for fixing a developed image onto a physical media.

* * * * *